United States Patent
Ueda

(10) Patent No.: US 12,482,186 B2
(45) Date of Patent: Nov. 25, 2025

(54) COMPUTER-READABLE NON-TRANSITORY STORAGE MEDIUM, INFORMATION PROCESSING APPARATUS, INFORMATION PROCESSING METHOD, AND INFORMATION PROCESSING SYSTEM

(71) Applicant: NINTENDO CO., LTD., Kyoto (JP)

(72) Inventor: Kazuhide Ueda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 226 days.

(21) Appl. No.: 18/356,574

(22) Filed: Jul. 21, 2023

(65) Prior Publication Data
US 2024/0062468 A1 Feb. 22, 2024

(30) Foreign Application Priority Data
Aug. 17, 2022 (JP) .................... 2022-130264

(51) Int. Cl.
G06T 17/20 (2006.01)
A63F 13/60 (2014.01)
A63F 13/837 (2014.01)

(52) U.S. Cl.
CPC .............. *G06T 17/20* (2013.01); *A63F 13/60* (2014.09); *A63F 13/837* (2014.09); *A63F 2300/66* (2013.01); *G06T 2210/21* (2013.01)

(58) Field of Classification Search
CPC ......... G06T 17/20; G06T 15/04; G06T 19/20; G06T 2219/2012; G06T 2210/21; A63F 13/60; A63F 13/837; A63F 13/577; A63F 2300/66
USPC ................................................. 345/418, 420
See application file for complete search history.

(56) References Cited

U.S. PATENT DOCUMENTS

| | | | |
|---|---|---|---|
| 2002/0030679 A1* | 3/2002 | McDowall | H04N 13/344 348/E13.041 |
| 2010/0329358 A1* | 12/2010 | Zhang | H04N 19/187 375/E7.02 |
| 2013/0314410 A1* | 11/2013 | Gravois | G06V 40/16 345/420 |
| 2018/0199022 A1 | 7/2018 | Ueda et al. | |

(Continued)

FOREIGN PATENT DOCUMENTS

| JP | 2005-122479 | 5/2005 |
|---|---|---|
| JP | 2005-128687 | 5/2005 |

(Continued)

OTHER PUBLICATIONS

Sato Shigeru Program, Information Storage Medium and Image Forming Apparatus May 12, 2005 Namco Ltd JP2005122479A Paras. 10-108, Fig. 1-10 Japanese.*

(Continued)

*Primary Examiner* — Prabodh M Dharia
(74) *Attorney, Agent, or Firm* — Nixon & Vanderhye PC

(57) ABSTRACT

A virtual surface is generated on the basis of a collision for contact determination. Furthermore, a polygon mesh associated with a first texture is associated with the virtual surface. When a predetermined range targeted by a color update event overlaps the collision, color at coordinates on a second texture associated with the virtual surface is updated on the basis of an association relationship between the collision and the virtual surface. Then, the polygon mesh is rendered using the first texture and the second texture.

20 Claims, 15 Drawing Sheets

(56) References Cited

U.S. PATENT DOCUMENTS

2020/0368616 A1\* 11/2020 Delamont ............ H04N 13/239
2021/0241502 A1\* 8/2021 Thurston, III ........ G06T 11/001
2023/0237738 A1\* 7/2023 Rump .................. G06V 10/141
                                                    345/419

FOREIGN PATENT DOCUMENTS

| JP | 2012-155570 | 8/2012 |
| JP | 2018-110659 | 7/2018 |
| JP | 2018102931 A | 7/2018 |

OTHER PUBLICATIONS

Sato Shigeru Program, Information Storage Medium and Image Forming Apparatus May 12, 2005 Namco Ltd JP2005122479A Paras. 10-108, Fig. 1-10 English.\*

Kamoshima Jun Program, Information Storage Medium and Image Feb. 14, 2008 Namco Bandai Games Inc JP2008033522A para. 3-150 Figs. 1-15 Japaneses.\*

Kamoshima Jun Program, Information Storage Medium and Image Feb. 14, 2008 Namco Bandai Games Inc JP2008033522A para. 3-150 Figs. 1-15 English.\*

\* cited by examiner

F I G. 1 6

| VIRTUAL SURFACE ID 521 | VIRTUAL SURFACE POSITION INFORMATION 522 | VIRTUAL SURFACE ORIENTATION INFORMATION 523 | CORRESPONDING COLLISION REGION INFORMATION 524 | CORRESPONDING STAGE REGION INFORMATION 525 | CORRESPONDING PAINT TEXTURE REGION INFORMATION 526 | COMBINATION RELATIONSHIP INFORMATION 527 |
|---|---|---|---|---|---|---|
| 001 | (x, y, z) | ... | (x,y,z)~(x,y,z) | (x,y,z)~(x,y,z) | (U,V)~(U,V) | Null |
| 002 | (x, y, z) | ... | (x,y,z)~(x,y,z) | (x,y,z)~(x,y,z) | (U,V)~(U,V) | Null |
| 003 | (x, y, z) | ... | (x,y,z)~(x,y,z) | (x,y,z)~(x,y,z) | (U,V)~(U,V) | 004 |
| 004 | (x, y, z) | ... | (x,y,z)~(x,y,z) | (x,y,z)~(x,y,z) | (U,V)~(U,V) | 003 |
| ... | ... | ... | ... | ... | ... | ... |

508

F I G. 1 7

509

| VERTEX INFORMATION 551 | UV COORDINATE INFORMATION 553 |
|---|---|
| (x,y,z) | (U0,V0) |
| (x,y,z) | (U1,V0) |
| (x,y,z) | (U0,V1) |
| (x,y,z) | (U1,V1) |
| ⋮ | ⋮ |

COMPUTER-READABLE NON-TRANSITORY STORAGE MEDIUM, INFORMATION PROCESSING APPARATUS, INFORMATION PROCESSING METHOD, AND INFORMATION PROCESSING SYSTEM

CROSS REFERENCE TO RELATED APPLICATION

This application claims priority to Japanese Patent Application No. 2022-130264 filed on Aug. 17, 2022, the entire contents of which are incorporated herein by reference.

FIELD

The present disclosure relates to information processing for executing game processing using an operation character, and more specifically relates to a polygon mesh rendering process.

BACKGROUND AND SUMMARY

Hitherto, a game in which a user operates an operation input means to control a character in a virtual space has been known. Furthermore, in such a game, an own character and an enemy character with which different colors are associated, respectively, exist, and the user paints the ground with the color associated with the own character, by operating the own character in the three-dimensional virtual space to cause the own character to discharge ink, and the enemy character can paint the ground with the color associated with the enemy character in the same manner.

In the above game, in order to represent the ground painted with the color of ink corresponding to each character, a process of performing rendering on a virtual space by writing the color of the ink to a texture having a size large enough to cover the entire virtual space, according to rendering data, and projecting the texture to the virtual space, is performed.

However, when projection is performed by the above method, a portion with which ink comes into contact and a portion that is actually painted may be displaced relative to each other, for example, at a location having a step, a curved surface, etc. For example, when ink comes into contact with the vicinity of a location having a difference in depth or height, the difference in depth or height is not reflected, and a position that should not be painted in view of the portion with which the ink has come into contact is painted with the ink.

Therefore, an object of the present disclosure is to provide a computer-readable non-transitory storage medium, an information processing apparatus, an information processing method, and an information processing system that enable more accurate representation when representing a state where a predetermined range in a virtual space is updated due to a color update event.

In order to attain the object described above, for example, the following configuration examples are exemplified.
(Configuration 1)

Configuration 1 is directed to a computer-readable non-transitory storage medium having stored therein instructions that, when executed by a computer of an information processing apparatus, cause the computer of the information processing apparatus to: read data regarding a polygon mesh in a virtual space, a first texture associated with the polygon mesh in a first association relationship, a collision for performing contact determination in the virtual space, and a second texture; generate a virtual surface corresponding to the collision, on the basis of at least a position of the read collision in the virtual space; associate the polygon mesh and the virtual surface with each other on the basis of at least a position in the virtual space of the generated virtual surface; associate the generated virtual surface and the read second texture with each other in a second association relationship; cause a color update event targeting a predetermined range to occur in the virtual space in which the polygon mesh and the virtual surface have been associated with each other and the virtual surface and the second texture have been associated with each other; when the predetermined range targeted by the color update event overlaps the collision, update color information of the second texture at coordinates corresponding to a position where the predetermined range overlaps the collision, on the basis of an association relationship between the collision and the virtual surface and the second association relationship between the virtual surface and the second texture; and render the polygon mesh using the first texture and the second texture.

According to the above configuration example, the virtual surface is generated on the basis of the collision, and the virtual surface is further associated with the polygon mesh. Accordingly, the polygon mesh and the collision are associated with each other via the virtual surface. Moreover, the color information of the position, corresponding to the position at which the collision occurs, in the second texture associated with the virtual surface is updated. Then, the polygon mesh is rendered using the second texture and the first texture associated with the polygon mesh. By updating the color of a part, of the second texture, corresponding to the position of the collision and rendering the polygon mesh via the virtual surface as described above, for example, when the color of a predetermined range is changed (e.g., the range is painted in a predetermined color) at the position at which contact with the collision is determined, a more accurate relationship can be established between the contact position and the predetermined range whose color is updated.
(Configuration 2)

According to Configuration 2, in Configuration 1 described above, a plurality of the virtual surfaces corresponding to a part of the collision in the virtual space may be generated, and a part of the polygon mesh may be associated with each of the plurality of the virtual surfaces.

According to the above configuration example, by providing a plurality of the virtual surfaces, more detailed association is enabled. Accordingly, the predetermined range whose color is changed can be subdivided, and a predetermined range more accurately corresponding to the position at which contact with the collision is determined can be determined.
(Configuration 3)

According to Configuration 3, in Configuration 2 described above, the part of the polygon mesh may be associated on the basis of a size of each of the plurality of the virtual surfaces.

According to the above configuration example, the virtual surface and the polygon mesh can be associated with each other on the same scale, so that a more appropriate association relationship can be established.
(Configuration 4)

According to Configuration 4, in Configuration 2 described above, the plurality of the virtual surfaces generated may be associated so as to be assigned to different portions of the second texture, respectively.

According to the above configuration example, only one second texture can be prepared, and an association relationship in which the second texture is shared by a plurality of virtual surfaces can be established.

(Configuration 5)

According to Configuration 5, in Configuration 1 or 2 described above, the virtual surface corresponding to the collision may be generated on the basis of at least a position and an orientation of the collision.

According to the above configuration example, since the virtual surface is generated in consideration of the position and the orientation of the collision, an association that is more accurate in terms of the position and the orientation can be established.

(Configuration 6)

According to Configuration 6, in Configuration 1 or 2 described above, the polygon mesh and the virtual surface may be associated with each other on the basis of at least a position and an orientation of the virtual surface in the virtual space.

According to the above configuration example, the association is performed in consideration of the orientation of the virtual surface. Accordingly, the polygon mesh and the virtual surface can be more appropriately associated with each other.

(Configuration 7)

According to Configuration 7, in Configuration 1 or 2 described above, the virtual surface and the polygon mesh may be associated with each other on the basis of a position and an orientation at and in which the virtual surface is placed in the virtual space and a position and an orientation of the polygon mesh.

According to the above configuration example, for each of the combination of the polygon mesh and the virtual surface and the combination of the collision and the virtual surface association can be performed such that the positional relationship therebetween is more correctly reflected.

(Configuration 8)

According to Configuration 8, in any one of Configurations 1 to 7 described above, when the predetermined range targeted by the color update event overlaps the collision, an update target region including first coordinates, at which the predetermined range and the collision overlap, in a first coordinate system corresponding to the virtual surface may be determined on the basis of an association relationship between the collision and the virtual surface, and color information at coordinates, corresponding to the update target region, on the second texture may be updated on the basis of the second association relationship between the virtual surface and the second texture.

(Configuration 9)

According to Configuration 9, in Configuration 8 described above, when there are at least two virtual surfaces determined to be adjacent to each other in accordance with positions and orientations thereof among a plurality of the virtual surfaces generated, the polygon mesh and the adjacent virtual surfaces may be associated with each other such that the adjacent virtual surfaces are treated as one virtual surface.

According to the above configuration example, the predetermined range targeted by the color update event can be prevented from being represented so as to be cut off at the boundary between two virtual surfaces that are in an adjacent relationship, so that a representation that does not give an uncomfortable feeling is enabled.

(Configuration 10)

According to Configuration 10, in Configuration 9 described above, when the first coordinates are calculated, the update target region may be determined using one pattern determined on the basis of a predetermined condition from among a plurality of patterns prepared in advance.

According to the above configuration example, since the size and the shape of the update target region can be determined by merely selecting a pattern from among the patterns prepared in advance, the processing load for determining the update target region can be reduced.

(Configuration 11)

According to Configuration 11, in any one of Configurations 1 to 10 described above, the second texture associated with the virtual surface on the basis of the second association relationship, and the polygon mesh may be further associated with each other in a third association relationship, and the polygon mesh may be rendered using the second texture associated in the third association relationship.

(Configuration 12)

According to Configuration 12, in any one of Configurations 1 to 11 described above, the instructions may further cause the computer to execute game processing of constructing a game stage in which the polygon mesh is placed as terrain, and causing a character object placed in the game stage to perform a shooting action on the basis of a user operation, and in the update of the color information, when the character object performs the shooting action, the color update event may be caused to occur, and the predetermined range may be determined on the basis of an impact position in the shooting action.

According to the above configuration example, for example, in a game in which terrain of a game stage is painted in a predetermined color, the color of a range accurately corresponding to an impact position can be updated, thereby providing a game experience that does not give an uncomfortable feeling to the user.

(Configuration 13)

According to Configuration 13, in Configuration 12 described above, a plurality of the character objects may be placed in the game stage, a predetermined color may be associated with each character object, and the color information of the second texture may be updated using the color associated with a character object on the basis of which the predetermined range is determined and that has performed the shooting action.

According to the above configuration example, for example, in a competitive game in which a win or loss is determined on the basis of the size of an area in which color information is updated in a game stage, such determination can be performed on the basis of a range accurately corresponding to an impact position, so that the fairness of the win/loss determination and the user's sense of satisfaction for the win/loss result can be enhanced further.

(Configuration 14)

According to Configuration 14, in Configuration 13 described above, in the game processing, when a color of a portion, on the polygon mesh, at which the character object is located is a color updated with the color associated with the character object, an effect advantageous to the character object may be generated.

According to the above configuration example, since the game situation becomes more advantageous if update is performed with the color corresponding to the own character, it is possible to provide motivation to update the color. In addition, a game nature of competing in update of color can be provided, thereby improving the entertainment characteristics of the competitive game.

According to the exemplary embodiments, the color information of a predetermined range more accurately corresponding to the position at which contact with the collision is determined can be updated.

BRIEF DESCRIPTION OF THE DRAWINGS

FIG. 16 illustrates a non-limiting example of the data structure of virtual surface data 508;

FIG. 17 illustrates a non-limiting example of the data structure of stage-paint texture association relationship data 509;

DETAILED DESCRIPTION OF NON-LIMITING EXAMPLE EMBODIMENTS

Hereinafter, an exemplary embodiment will be described.
[Hardware Configuration of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

Figure 1:
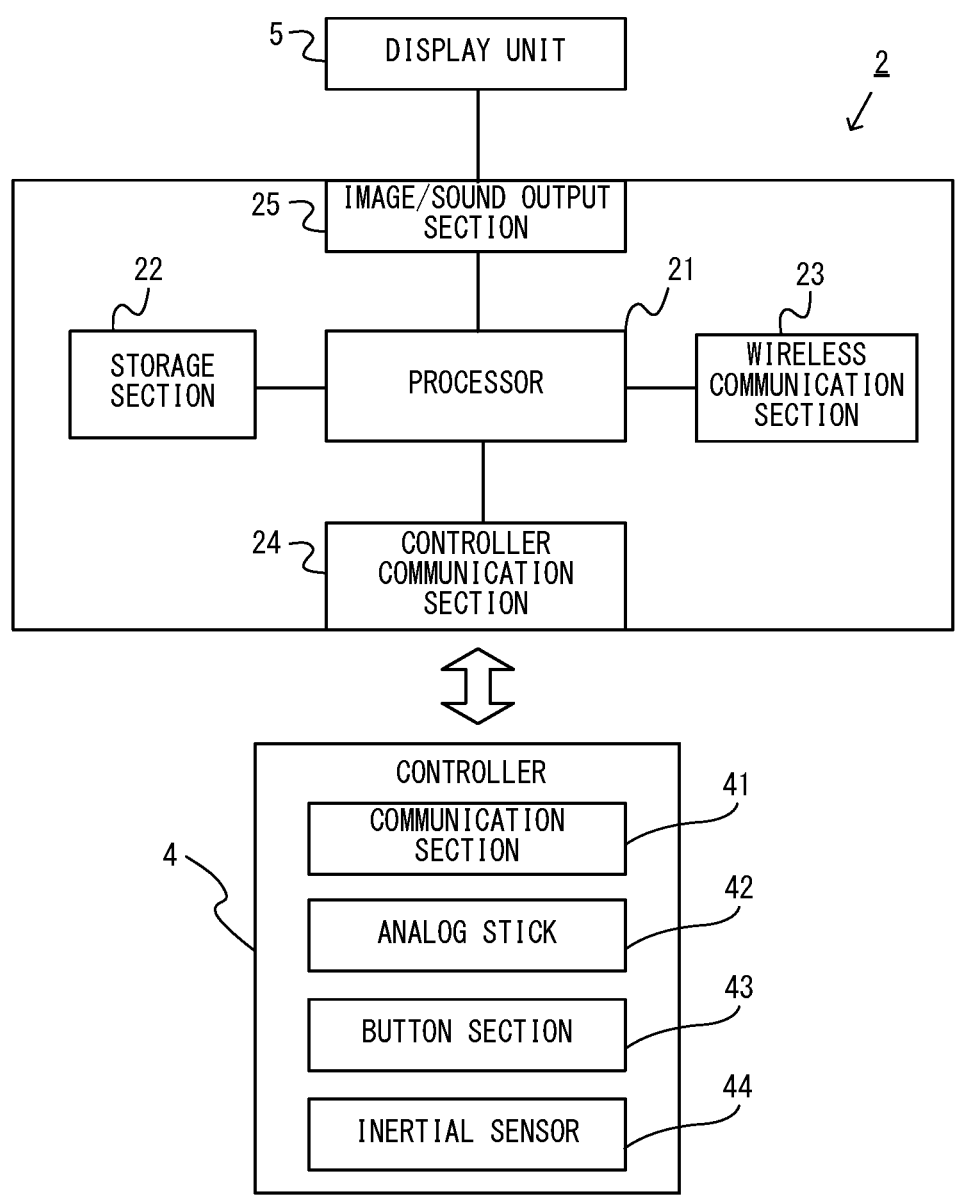
FIG. 1 is a block diagram showing the hardware configuration of a game apparatus 2.

FIG. 1 is a block diagram showing an example of the internal configuration of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 or a predetermined server device. As this wireless communication, for example, internet communication or short-range wireless communication is used.

The game apparatus 2 also includes a controller communication section 24 for the game apparatus 2 to perform wired or wireless communication with a controller 4.

Moreover, a display unit 5 (for example, a television or the like) is connected to the game apparatus 2 via an image/sound output section 25. The processor 21 outputs an image and sound generated (for example, by executing the above information processing) to the display unit 5 via the image/sound output section 25.

Next, the controller 4 will be described. Although not shown, the controller 4 of the exemplary embodiment has a housing having a vertically long shape, and can be held in the orientation in which the housing is vertically long. The housing has a shape and a size that allow the housing to be held with one hand when the housing is held in the orientation in which the housing is vertically long.

The controller 4 includes at least one analog stick 42 which is an example of a direction input device. The analog stick 42 can be used as a direction input section with which a direction can be inputted. By tilting the analog stick 42, a user is allowed to input a direction corresponding to the tilt direction (also input a magnitude corresponding to the tilt angle). In addition, the controller 4 includes a button section 43 including various operation buttons. For example, the controller 4 may include a plurality of operation buttons on a main surface of the housing.

Moreover, the controller 4 includes an inertial sensor 44. Specifically, the controller 4 includes an acceleration sensor and an angular velocity sensor as the inertial sensor 44. In the exemplary embodiment, the acceleration sensor detects the magnitudes of accelerations along predetermined three axial directions. In addition, the angular velocity sensor detects angular velocities about predetermined three axes.

The controller 4 also includes a communication section 41 for performing wired or wireless communication with the controller communication section 24. The content of a direction input to the analog stick 42, information indicating a pressed state of the button section 43, and various detection results by the inertial sensor 44 are repeatedly outputted to the communication section 41 and transmitted to the game apparatus 2 at appropriate timings.

[Game Assumed in Exemplary Embodiment]

Next, processing executed in the exemplary embodiment will be described. First, as an assumption thereof, an outline of a game assumed in the exemplary embodiment will be described. The game assumed in the exemplary embodiment is a competitive game that is played by a user operating the controller to control a character in a virtual space. More specifically, in the game, different colors are associated with an own character and an enemy character, respectively. Hereinafter, the color associated with each character is referred to as association color. The user can operate the own character in a 3D virtual space to paint a predetermined range in the virtual space with ink having the association color of the own character. Specifically, the own character can paint the ground and walls (hereinafter, referred to as ground, etc.) around the position at which the own character is located, with the ink having the association color of the own character. In addition, similarly, the enemy character can paint the ground, etc. with ink having the association color of the enemy character. Then, in the game, a competition is determined on the basis of a rendered state of the association color of the own character and a rendered state of the association color of the enemy character.

Giving supplementary description regarding how to paint the ground, etc., the user can paint the ground, etc. in the virtual space by operating the own character to cause a rendering event to occur. One type of the rendering event is "firing an ink bullet with an ink gun". By firing the ink bullet, the ink is applied to a predetermined range including the impact position of the ink bullet when the ink bullet is fired from the position of the own character in a direction in which the own character faces. In addition, examples of other types of the rendering event include "application with a roller", "attacking the enemy character", etc. However, in this example, a description will be given with firing of an ink bullet as an example of the rendering event.

Each character can obtain an advantageous effect in a range painted with the ink having the association color of the character. For example, on the ground painted with the ink having the association color of the own character, the own character can move at a higher speed in the virtual space.

Next, an outline of the processing in the exemplary embodiment will be described. The processing described in the exemplary embodiment relates to a process of "painting" the ground, etc. by firing the ink bullet and a rendering process thereof.

First, elements constituting a game stage (hereinafter, simply referred to as stage) to be painted with the ink will be described. In the exemplary embodiment, the stage constructed in the virtual space is roughly composed of a stage polygon mesh (hereinafter, referred to as stage mesh), a collision, and a virtual surface. The stage mesh is a polygon mesh forming the terrain (ground, walls, and ceilings) of the stage. The stage mesh is finally rendered by attaching a texture described later thereto. The collision is an element used for determining contact between the character and the ink bullet or the like. In the exemplary embodiment, the shape of the collision is a shape (collision mesh) that is the same as that of the stage mesh. However, in another exemplary embodiment, the shape of the collision does not have to be the same as that of the stage mesh, and may be, for example, a spherical shape or a box shape. The collision is also an element that is placed but not rendered. The virtual surface is a rectangular surface that is generated on the basis of the collision and placed at a predetermined position in the virtual space. A plurality of virtual surfaces can be generated and placed. In addition, in the exemplary embodiment, as for the sizes of the virtual surfaces generated, the size of each virtual surface is determined on the basis of the size of the mesh of the collision considered as one group. However, in another exemplary embodiment, a plurality of virtual surfaces may be generated and placed so as to uniformly have a predetermined size. In addition, the virtual surfaces are also elements that are not rendered.

As textures used for rendering the stage mesh, there are elements, that is, a stage texture and a paint texture. The stage texture is a texture for rendering the surface of the terrain of the stage. The association relationship between each vertex of the stage mesh and UV coordinates of the stage texture is defined in advance.

The paint texture is a texture for representing a region painted with the ink by the ink bullet. The paint texture is initially a transparent texture. In the exemplary embodiment, the paint texture is also a single (rectangular) texture having a size larger than that of the virtual surface, and is specifically a texture having a size large enough to cover the entire stage. In processing described later, color information of a part of the paint texture is updated with the association color. Finally, the stage mesh is rendered such that the paint texture is prioritized over the stage texture, whereby a state where the ground, etc., are painted with the ink is represented. As for the update of the color information, for example, each component of RGBA may have information indicating the density of color (density of painting) corresponding to the above-described own character or enemy character, and this information may be updated. In addition, the paint texture is divided into a plurality of regions, and any of the plurality of regions is associated with each virtual surface. In the exemplary embodiment, a plurality of virtual surfaces are placed in the virtual space, and a portion of the paint texture is associated with each of the virtual surfaces. That is, one large paint texture is shared by a plurality of virtual surfaces. Specifically, this association is performed by defining an association relationship between UV coordinates of the paint texture and coordinates in a coordinate system of each virtual surface. For example, the coordinates of the four corners of each virtual surface and the coordinates of the four corners of the portion of the paint texture are associated with each other. In addition, in the exemplary embodiment, each virtual surface and the portion of the paint texture are associated with each other such that the portions of the paint texture associated with the respective virtual surfaces do not overlap each other.

[Placement Position Relationship]

Figure 2:
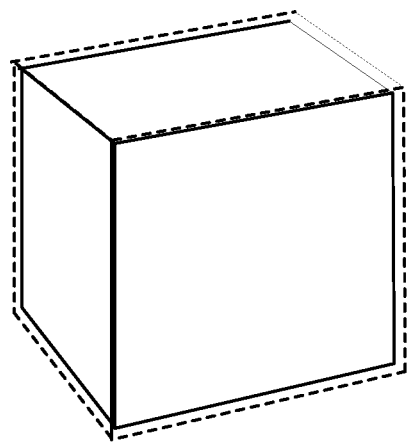
FIG. 2 shows a non-limiting example of placement of virtual surfaces.
Figure 3:
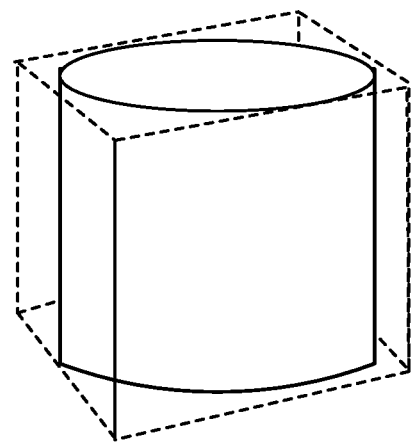
FIG. 3 shows a non-limiting example of the placement of the virtual surfaces.

In the exemplary embodiment, the stage is configured by placing the stage mesh, the collision, and the virtual surfaces described above in the virtual space. As for the relationship between the placement positions of these elements, in the exemplary embodiment, these elements are placed so as to almost overlap or be in close contact with each other. In other words, elements to be associated with each other are placed so as to have a positional relationship in which (portions of) the elements are close to each other. Here, since the stage mesh and the collision have the same shape, the stage mesh and the collision can be placed in an overlapping manner at the exact same position. Meanwhile, since each virtual surface is a rectangular surface as described above, the virtual surface does not match the stage mesh or the collision in shape in some cases. Therefore, the virtual surface may be placed so as to match the shape of the stage mesh as closely as possible. For example, in the case of a stage mesh/collision having a rectangular parallelepiped shape, the virtual surfaces may be placed so as to overlap surfaces thereof as shown in FIG. 2. In the case of a stage mesh/collision having a columnar shape, the virtual surfaces may be placed so as to surround the stage mesh/collision as shown in FIG. 3. In the exemplary embodiment, a plurality of virtual surfaces are placed such that the entirety of (the surface of) a stage mesh/collision is covered by combining all the virtual surfaces. That is, there is no (surface of) stage mesh/collision that is not associated with any virtual surface.

[Outline of Processing in Exemplary Embodiment]

Next, the outline of the processing according to the exemplary embodiment will be described. In the game, when a stage to be played is selected and an instruction to start play in this stage is performed, first, data that defines the configuration of the stage (stage data 502 described later) is loaded. Then, the stage mesh and the collision are placed in the virtual space on the basis of the content defined in this data. Then, a process of generating virtual surfaces is performed on the basis of the position and/or the orientation of the collision. Then, a process of associating the virtual surface and the stage mesh with each other is performed on the basis of the positions and/or the orientations of the generated virtual surfaces. Then, a portion of the paint texture is associated with each generated virtual surface. In the exemplary embodiment, each generated virtual surface and (a portion of) the stage mesh located closest thereto are associated with each other. In this case, each generated virtual surface and the stage mesh are associated with each other in consideration of the orientation (normal direction) of the virtual surface and the orientation (normal direction) of the surface of the stage mesh. Specifically, a virtual surface and a portion of the stage mesh whose normal directions are the same or similar to each other (having substantially the same orientation) are associated with each other.

Figure 4:
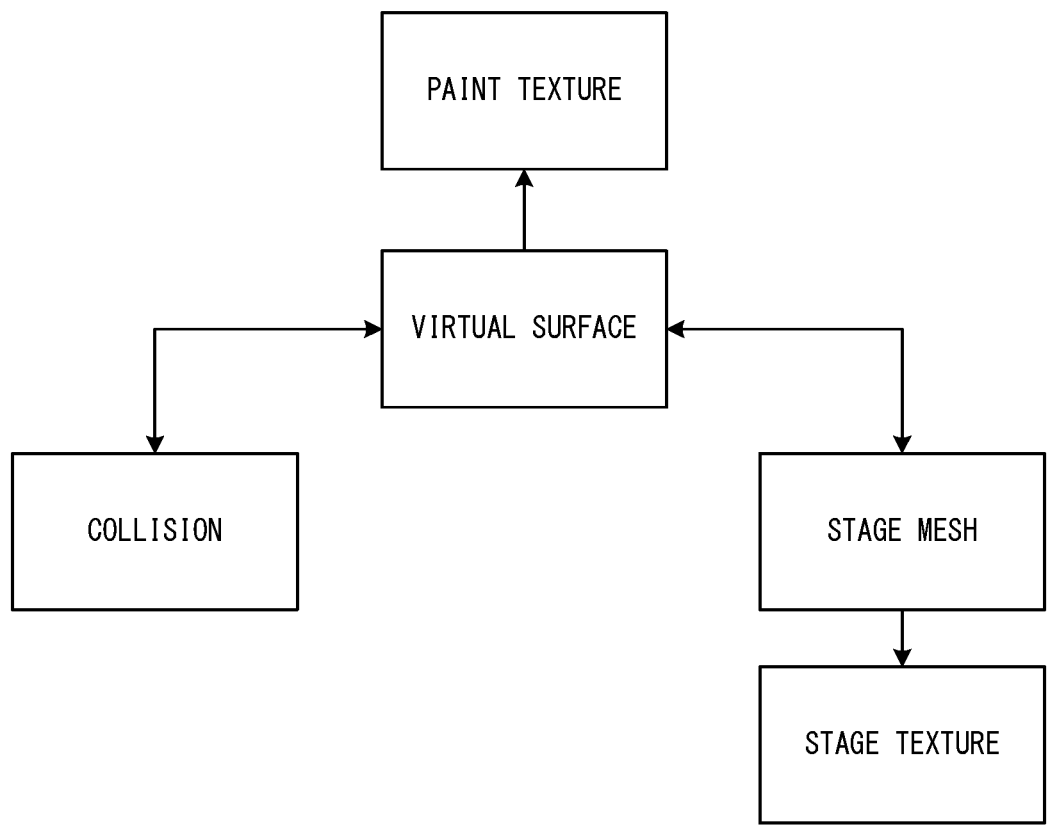
FIG. 4 is a non-limiting example diagram showing a relationship between elements of a game stage.

As a result of this association, an association relationship shown in FIG. 4 is established between the elements of the stage. In FIG. 4, the virtual surfaces are associated with a predetermined paint texture as described above. FIG. 4 shows that such virtual surfaces are associated with the stage mesh and the collision on the basis of the positions and the orientations thereof as described above. That is, the stage mesh and the collision are associated with each other via the virtual surfaces. In addition, the stage texture is associated with the stage mesh in advance, and an association relationship between each vertex of the stage mesh and the UV coordinates of the stage texture is defined as described above. By performing such association, the collision and the stage mesh are associated with each other via the virtual surfaces. In addition, for the stage mesh, an association relationship between each vertex of the stage mesh and the UV coordinates of the paint texture is also defined as a result of the association via the virtual surfaces.

Figure 5:
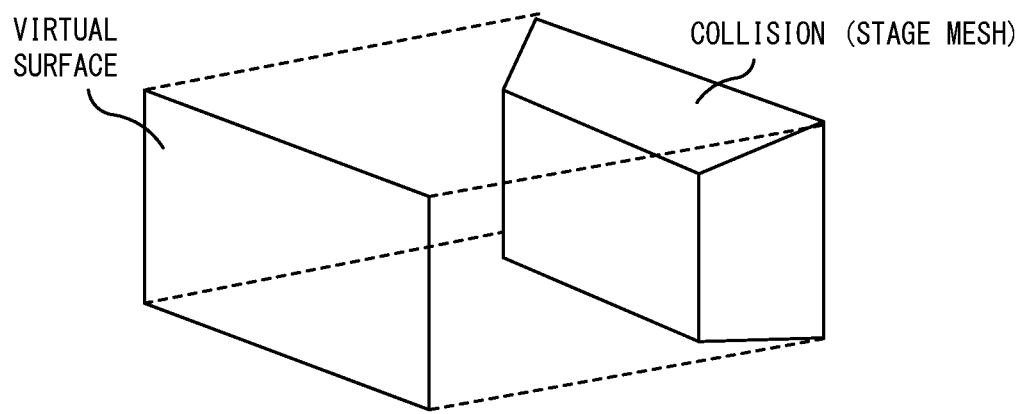
FIG. 5 is a non-limiting example diagram for describing an outline of processing of an exemplary embodiment.

For example, the case where, as a result of the above association, for a portion of the stage mesh/collision, the collision (stage mesh) and a virtual surface are associated with each other as shown in FIG. 5, is assumed. In FIG. 5, the virtual surface and the collision are separated from each other to make it easier to understand the relationship therebetween, but the virtual surface and the collision (stage mesh) may actually be placed so as to almost overlap or be in close contact with each other as described above. Hereinafter, the outline of the processing of the exemplary embodiment will be described with reference to FIG. 6 to FIG. 10 with the case where such association is performed, as an example. FIG. 6 to FIG. 10 are schematic diagrams showing the outline of the processing according to the exemplary embodiment.

Figure 6:
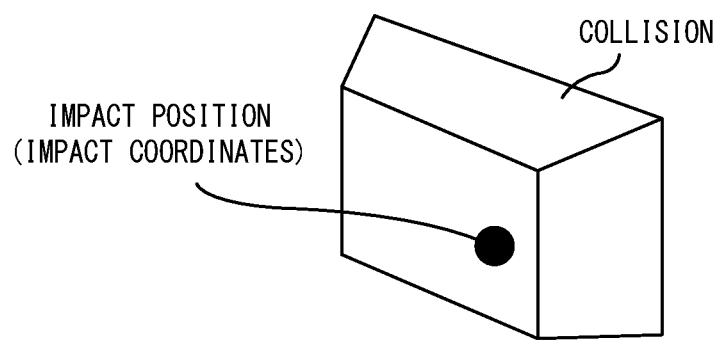
FIG. 6 is a non-limiting example diagram for describing the outline of the processing of the exemplary embodiment.

First, it is assumed that as a result of an ink bullet being fired (a rendering event), the ink bullet collides with (hereinafter, referred to as impacts) the collision. FIG. 6 shows an example of the impact position on the collision. In this case, the occurrence of such an impact is detected, and impact coordinates in a local coordinate system (3D coordinate system) of the collision are calculated.

Figure 7:
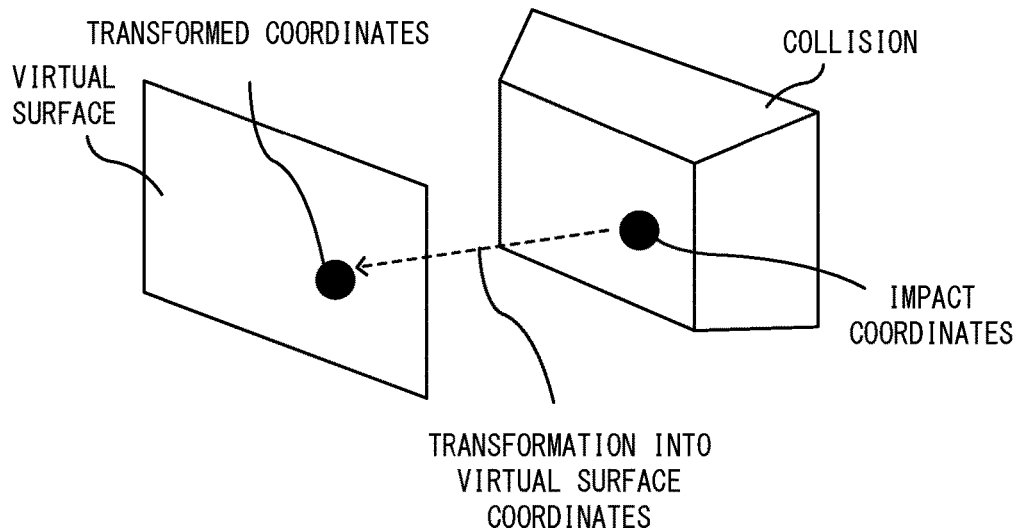
FIG. 7 is a non-limiting example diagram for describing the outline of the processing of the exemplary embodiment.

Next, as shown in FIG. 7, the impact coordinates (3-dimensional coordinates) are transformed into coordinates in a coordinate system (2-dimensional coordinate system) of the virtual surface associated with the collision (any coordinate transformation method may be used). Hereafter, the transformed coordinates on the virtual surface are referred to as "transformed coordinates".

Figure 8:
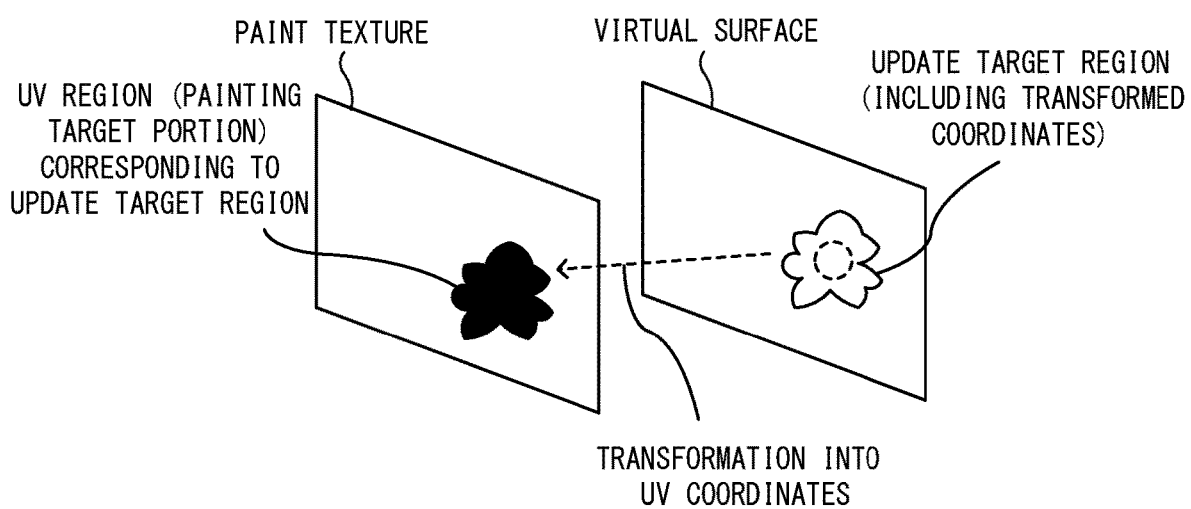
FIG. 8 is a non-limiting example diagram for describing the outline of the processing of the exemplary embodiment.

Next, as shown in FIG. 8, (the shape of) a region to be painted with ink is determined on the virtual surface. In the exemplary embodiment, several regions having different shapes are defined in advance as "painting patterns", and one painting pattern is randomly selected from among these painting patterns. Then, the region on the virtual surface is calculated by placing the selected painting pattern at a position including the transformed coordinates (typically, a position where the transformed coordinates are at the center thereof). Hereinafter, this region is referred to as update target region.

Next, a region (hereinafter, referred to as UV region), corresponding to the update target region, in a UV coordinate system of the paint texture associated with the virtual surface is specified as a painting target portion. That is, the coordinates of the update target region are transformed into UV coordinates. Then, the color information of the painting target portion is updated to the association color corresponding to the character that has fired the ink bullet. Accordingly, a texture in which a part (painting target portion) on the transparent paint texture has the above association color is created.

Figure 9:
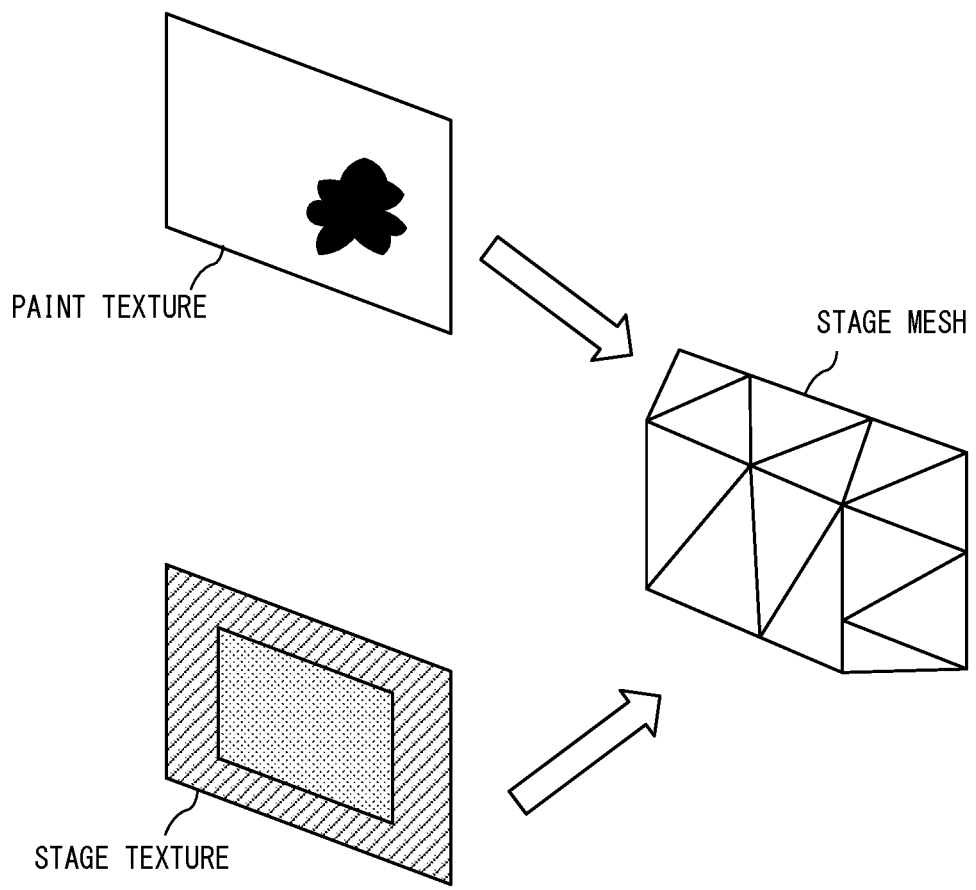
FIG. 9 is a non-limiting example diagram for describing the outline of the processing of the exemplary embodiment.
Figure 10:
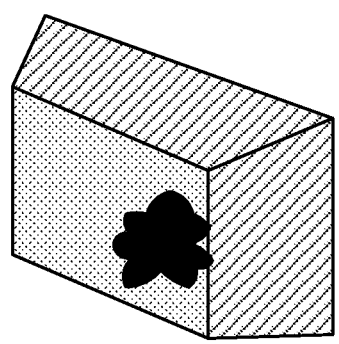
FIG. 10 is a non-limiting example diagram for describing the outline of the processing of the exemplary embodiment.

Next, as shown in FIG. 9, a process of rendering the stage mesh associated with the above virtual surface by using the paint texture and the stage texture is performed. In this example, first, a rendering process in which the stage texture is attached to the stage mesh and the paint texture is attached thereto (blending of two textures) is performed. As a result, a representation in which a part of the stage mesh is painted with the association color as shown in FIG. 10 can be performed.

[Combining of Virtual Surfaces]

Figure 11:
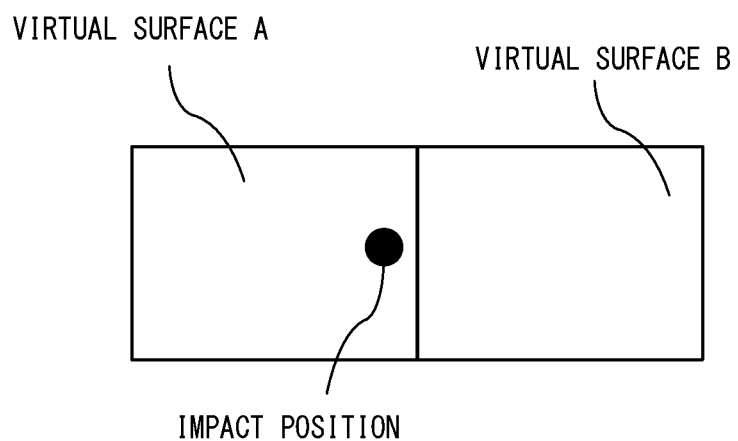
FIG. 11 is a non-limiting example diagram for describing combining of virtual surfaces.
Figure 12:
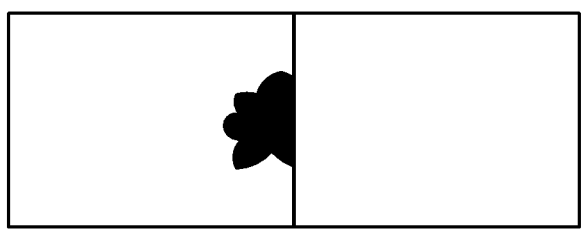
FIG. 12 is a non-limiting example diagram for describing combining of virtual surfaces.
Figure 13:
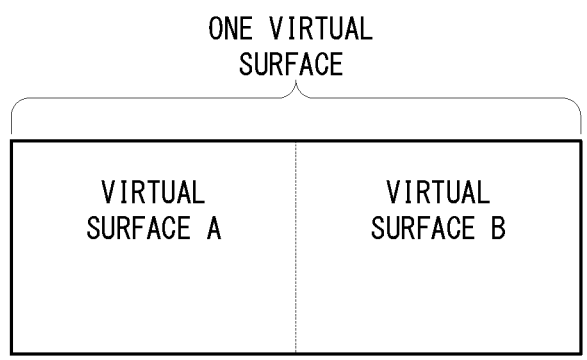
FIG. 13 is a non-limiting example diagram for describing the combining of the virtual surfaces.
Figure 14:
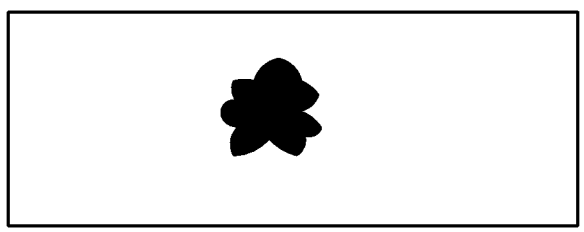
FIG. 14 is a non-limiting example diagram for describing the combining of the virtual surfaces.

Here, in the exemplary embodiment, the following process is also performed. For example, it is assumed that two virtual surfaces are placed adjacent to each other as shown in FIG. 11. Then, it is assumed that an ink bullet impacts a position close to the right edge of a virtual surface A. In this case, when a painting target region is determined on the basis of only the virtual surface A through the above-described process and the color information is updated, the representation may be finally a representation in which a part of the painting pattern is cut off at the boundary between the virtual surfaces A and B as shown in FIG. 12. Such a representation may be perceived as unnatural by the user. Therefore, in the exemplary embodiment, in the above association process, virtual surfaces placed adjacent to each other are combined and treated as one virtual surface as shown in FIG. 13. Along with this, association is performed such that the region of the paint texture associated with each virtual surface is shared. Then, the above process is performed using the combined virtual surface, thereby enabling a painting representation that does not give an uncomfortable feeling, as shown in FIG. 14. Such combining of virtual surfaces can be performed, for example, for virtual surfaces to be placed on terrain like a so-called platform such as columnar terrain or cube-shaped terrain. In particular, as for columnar terrain, for example, a process of attaching a paint texture to a column in a wrapping manner is conceivable, but in this case, there is a possibility that a representation at a joint is not an appropriate representation (the representation becomes a representation in which the paint texture is not connected pictorially). In this respect, by using virtual surfaces and performing a process of combing and treating adjacent virtual surfaces as in the exemplary embodiment, a representation that does not give an uncomfortable feeling is enabled even when a painting representation is performed on a column.

[Details of Game Processing of Exemplary Embodiment]

Next, the processing in the exemplary embodiment will be described in more detail with reference to FIG. 15 to FIG. 21.

[Data to be Used]

Figure 15:
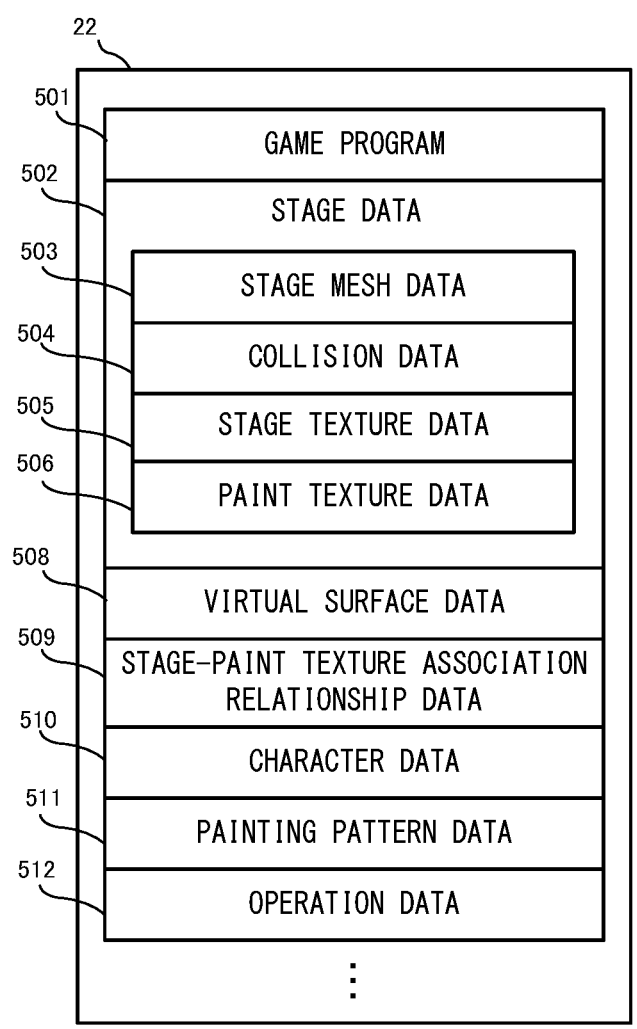
FIG. 15 illustrates a non-limiting example of data stored in a storage section 22 of the game apparatus 2.

First, various kinds of data used in the exemplary embodiment will be described. FIG. 15 illustrates a memory map showing an example of various kinds of data stored in the storage section 22 of the game apparatus 2. In the storage section 22 of the game apparatus 2, a game program 501, the stage data 502, virtual surface data 508, stage-paint texture association relationship data 509, character data 510, painting pattern data 511, operation data 512, etc., are stored.

The game program 501 is a program for executing game processing according to the exemplary embodiment. Specifically, the game program 501 is a program for executing processing shown in a flowchart in FIG. 20 described later.

The stage data 502 is data that defines the configuration of the above stage. FIG. 15 shows the case of only one stage data 502, but if there are a plurality of stages, stage data 502 corresponding to each stage may be stored. The stage data 502 includes at least stage mesh data 503, collision data 504, stage texture data 505, and paint texture data 506.

The stage mesh data 503 is data regarding the above stage mesh. The stage mesh data 503 includes information on the polygon mesh forming the stage, information that defines the placement position and the orientation of the polygon mesh in the virtual space, etc. In addition, the information on the polygon mesh includes vertex information representing the shape of the stage, and information designating the UV coordinates of the stage texture to be assigned with each vertex.

The collision data 504 is data that defines the shape of the above collision and the placement position and the orientation of the collision in the virtual space.

The stage texture data 505 is data of textures to be attached to the surface of the above stage mesh (e.g., an albedo map or the like).

The paint texture data 506 is data of the above paint texture. In the exemplary embodiment, a transparent texture is initially set in the paint texture data 506.

Next, the virtual surface data 508 is data that defines the above-described virtual surfaces. FIG. 16 illustrates an example of the data structure of the virtual surface data 508. As shown in FIG. 16, the virtual surface data 508 is a database consisting of a set of records each including at least items such as a virtual surface ID 521, virtual surface position information 522, virtual surface orientation information 523, corresponding collision region information 524, corresponding stage region information 525, corresponding paint texture region information 526, and combination relationship information 527. The virtual surface ID 521 is an ID for identifying each of a plurality of virtual surfaces. The virtual surface position information 522 is information indicating the position at which the virtual surface is placed in the virtual space, and the virtual surface orientation information 523 is information indicating the orientation of the virtual surface when the virtual surface is placed. The corresponding collision region information 524 is information indicating a region (portion), on the collision, associated with the virtual surface. For example, the coordinates of a region, on the collision, corresponding to the coordinates of the four corners of the virtual surface are set as the corresponding collision region information 524. The corresponding stage region information 525 is information indicating a region (portion), on the stage mesh, associated with the virtual surface. For example, as in the case of the collision, the coordinates of a region, on the stage mesh, corresponding to the coordinates of the four corners of the virtual surface are set as the corresponding stage region information 525. The corresponding paint texture region information 526 is information for specifying a region, on the paint texture, associated with the virtual surface. For example, the UV coordinates of the four corners of the region can be set as the corresponding paint texture region information 526. The combination relationship information 527 is information indicating, when a plurality of virtual surfaces are combined and treated as one virtual surface as described above, a virtual surface with which the virtual surface is combined.

Referring back to FIG. 15, the stage-paint texture association relationship data 509 is data that defines an association relationship between the vertex information of the stage mesh and the UV coordinates of the paint texture. The stage-paint texture association relationship data 509 is generated on the basis of the association relationship between the stage mesh and the virtual surface. FIG. 17 illustrates an example of the data structure of the stage-paint texture association relationship data 509. The stage-paint texture association relationship data 509 is a database consisting of a set of records each including at least vertex information 551 and UV coordinate information 553. The vertex information 551 is the coordinates of each vertex of the stage mesh. The UV coordinate information 553 is information designating the UV coordinates to be referred to in the above paint texture. The stage-paint texture association relationship data 509 allows the UV coordinates of the paint texture to be directly referred to in a process of rendering the stage mesh.

Referring back to FIG. 15, the character data 510 is data regarding the own character and the enemy character. The character data 510 includes information (3D model information, etc.) indicating the appearance of each character, and information (position, orientation, movement speed, status, animation data, etc.) for controlling the action of each character.

The painting pattern data 511 is data that defines the shape of the above-described update target region as a painting pattern. As described above, in the exemplary embodiment, a plurality of painting patterns are defined.

The operation data 512 is data indicating the content of an operation performed by the user on the controller 4. The operation data 512 is data transmitted from the controller 4 to the processor 21 at a predetermined time interval, and includes information indicating pressed states of various buttons, information indicating the content of an input to the analog stick 42, etc.

In addition, various kinds of data required for the game processing which are not shown are also stored in the storage section 22.

Next, the game processing in the exemplary embodiment will be described in detail. Here, processing related to firing of the above ink bullet to rendering for painting will be described, and the detailed description of other various kinds of game processing is omitted. In addition, in the exemplary embodiment, flowcharts described below are realized by one or more processors reading and executing the above program stored in one or more memories. The flowcharts are merely an example of the processing. Therefore, the order of each process step may be changed as long as the same result is obtained. In addition, the values of variables and thresholds used in determination steps are also merely examples, and other values may be used as necessary.

[Details of Processing Executed by Processor 21]

Figure 18:
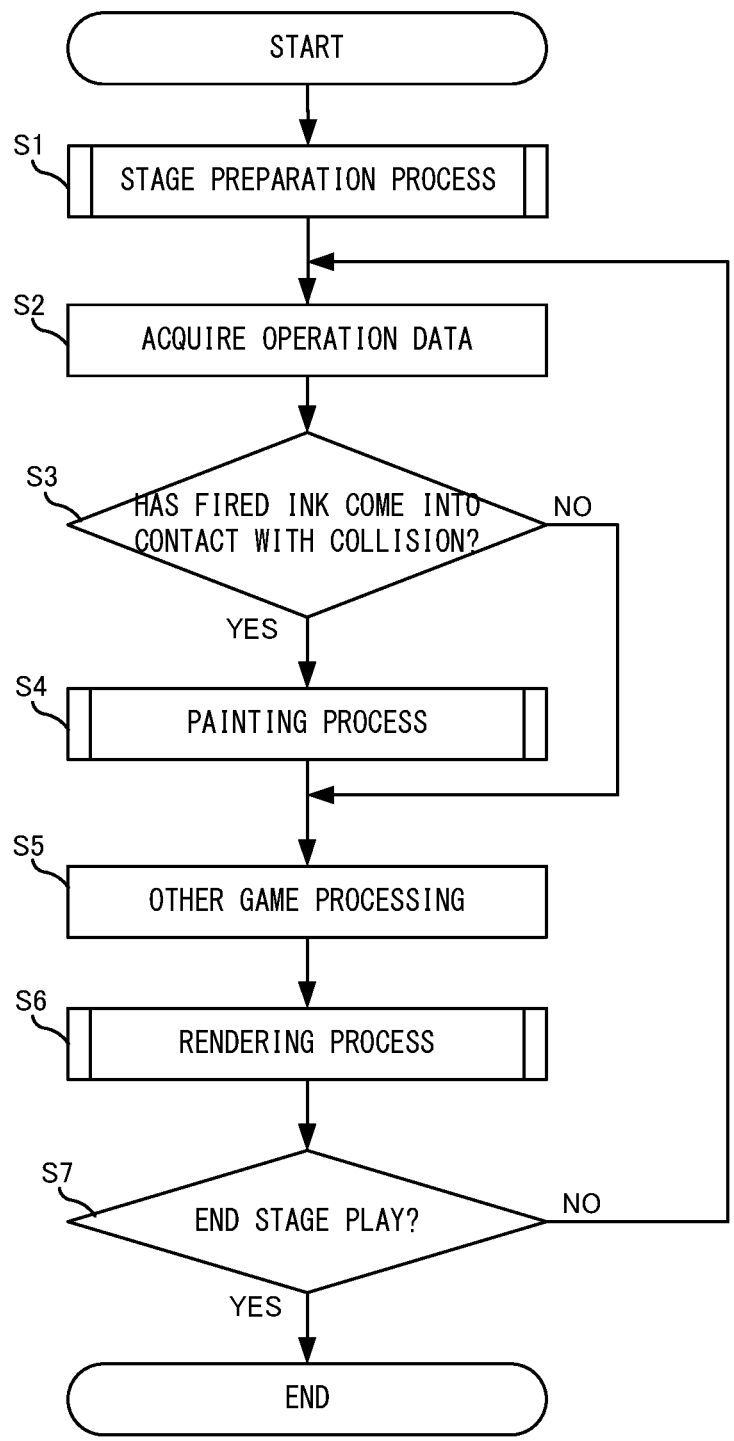
FIG. 18 is a non-limiting example flowchart showing the details of game processing according to the exemplary embodiment.

FIG. 18 is a flowchart showing the game processing according to the exemplary embodiment. This processing is started, for example, in accordance with the user performing a predetermined operation for instructing start of play of a stage.

[Stage Preparation Process]

Figure 19:
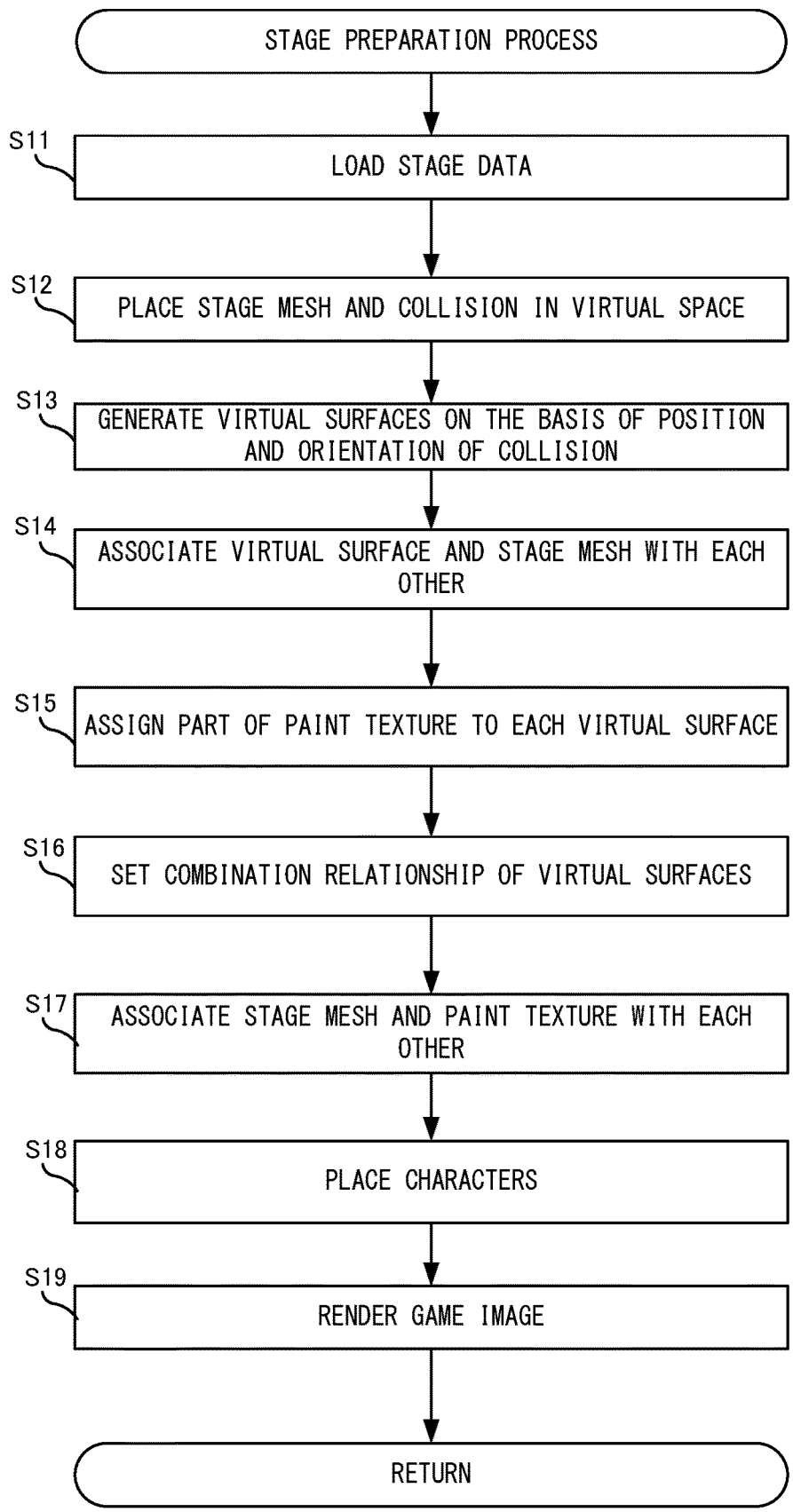
FIG. 19 is a non-limiting example flowchart showing the details of a stage preparation process.

In FIG. 18, first, in step S1, the processor 21 executes a stage preparation process. FIG. 19 is a flowchart showing the details of the stage preparation process in step S1 above. First, in step S11, the processor 21 loads the stage data 502 corresponding to a stage selected by the user as a play target, from, for example, a game cartridge or the like into the storage section 22. Next, in step S12, the processor 21 constructs the stage to be played, by placing the stage mesh and the collision in the virtual space on the basis of the loaded stage data 502.

Next, in step S13, the processor 21 generates the virtual surface data 508 on the basis of the position and the orientation of the collision. That is, a process of generating virtual surfaces and placing the virtual surfaces in the virtual space is performed. Specifically, the processor 21 divides the collision to be placed in the stage, into a plurality of regions, and generates a virtual surface for each of the divided collisions. As an example of the method for dividing the collision into a plurality of regions, in the exemplary embodiment, among a plurality of meshes constituting the collision, meshes having a predetermined relationship are collected and made into one group, and one corresponding virtual surface is generated for each of regions corresponding to the meshes made into one group. For example, among a plurality of triangular meshes constituting the collision, triangular meshes that share at least one side and that have the same or close normal directions corresponding thereto may be made into one group as having a predetermined relationship. Then, on the basis of the positions and the orientations of regions corresponding to the triangular meshes, virtual surfaces are generated and positioned such that the virtual surfaces overlap or are close to the respective regions. Accordingly, a record in which the virtual surface ID 521, the virtual surface position information 522, the virtual surface orientation information 523, and the corresponding collision region information 524 of the virtual surface data 508 are set is generated. In the exemplary embodiment, the example in which the virtual surfaces are based on both the position and the orientation of the collision is described, but in another exemplary embodiment, virtual surfaces may be generated on the basis of only one of the position and the orientation of the collision.

Next, in step S14, the processor 21 associates the virtual surfaces and the stage mesh with each other. Specifically, the processor 21 refers to the virtual surface data 508 and extracts any region (portion), of the stage mesh, positioned closest to each virtual surface. Furthermore, the processor 21 selects a region, of the stage mesh, having substantially the same orientation as the virtual surface, from the extraction result. For example, the coordinates, on the stage mesh, closest to the coordinates of the four corners of each virtual surface may be determined, and a region surrounded by the four coordinates thus determined may be extracted. If there are a plurality of extracted portions, a region having the same orientation as the virtual surface may be selected. Then, the processor 21 sets the corresponding stage region information 525 of the virtual surface data 508 such that the selected region of the stage mesh is associated with the virtual surface.

Next, in step S15, the processor 21 assigns a portion of the paint texture to each virtual surface. The assigning method may be any method, and, for example, a portion on the paint texture may be assigned in the order from the lowest number of the virtual surface ID 521 from the upper left to the lower right of the paint texture, for example, in the order similar to that when scanning a monitor. In the exemplary embodiment, two or more virtual surfaces are not assigned to a certain portion on the paint texture. Then, the processor 21 sets information indicating the association relationship of this assignment, specifically, UV coordinates indicating the assigned regions, in the corresponding paint texture region information 526.

Next, in step S16, the processor 21 sets a combination relationship of the virtual surfaces. Specifically, the processor 21 determines the adjacency relationship of the virtual surfaces, and sets the combination relationship information 527 such that virtual surfaces having an adjacent position relationship are treated as one virtual surface.

Next, in step S17, the processor 21 associates the stage mesh and the paint texture with each other by generating the stage-paint texture association relationship data 509. Specifically, the processor 21 specifies the region of the stage mesh and the region of the paint texture that are associated with each other via each virtual surface, on the basis of the virtual surface data 508. Then, the processor 21 calculates an association relationship between each vertex in the stage mesh and the UV coordinates of the paint texture through a predetermined coordinate transformation process, and generates the stage-paint texture association relationship data 509 on the basis of the result of the calculation. In this case, for example, the vertices, of the stage mesh, corresponding to the coordinates of the four corners of the above virtual surface may be associated with the coordinates of the four corners of the paint texture, and a content including only an association relationship for these four vertices may be set as the stage-paint texture association relationship data 509. UV coordinates corresponding to portions between these four vertices may be calculated through interpolation using a predetermined mathematical expression. Even if the portion, of the stage mesh, corresponding to the virtual surface is a portion having many vertex information pieces, when only an association relationship for the four vertices can be established as described above, the other vertices can be interpolated, so that a reduction in the processing load for generating the stage-paint texture association relationship data 509 can be expected.

Next, in step S18, the processor 21 places the own character and the enemy character at predetermined positions in the virtual space. In addition, the processor 21 also places predetermined objects (items, etc.) in the virtual space as appropriate.

Next, in step S19, the processor 21 takes an image of the virtual space constructed as described above, with a virtual camera, and renders the image as a game image. Since the paint texture is initially a transparent texture as described above, the stage mesh is rendered at this time, substantially using only the stage texture. Then, the processor 21 ends the stage preparation process.

Referring back to FIG. 18, next, in step S2, the processor 21 acquires the operation data 512. Next, in step S3, the processor 21 determines whether or not an ink bullet fired by a predetermined character has collided with the collision, that is, the processor 21 performs a process of detecting occurrence of an impact. As a result of the determination, if an impact has not occurred (NO in step S3), the processor 21 advances the processing to step S5 described later.

[Painting Process]

Figure 20:
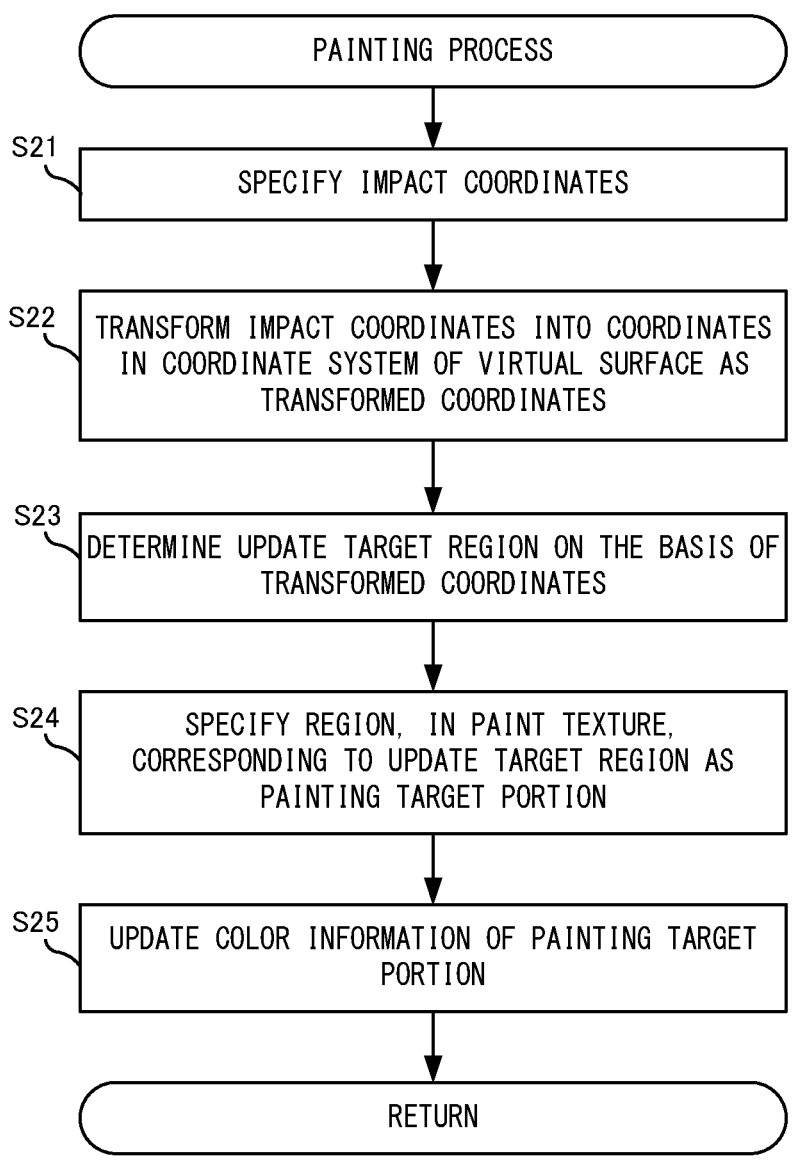
FIG. 20 is a non-limiting example flowchart showing the details of a painting process.

On the other hand, if an impact has occurred (YES in step S3), in step S4, the processor 21 executes a painting process. FIG. 20 is a flowchart showing the details of the painting process. In FIG. 20, first, in step S21, the processor 21 specifies the impact coordinates in the local coordinate system of the collision.

Next, in step S22, the processor 21 transforms the impact coordinates in the local coordinate system of the collision into the above transformed coordinates in the local coordinate system of the virtual surface corresponding to (the portion of) the collision.

Next, in step S23, the processor 21 determines the update target region on the virtual surface on the basis of the transformed coordinates. Specifically, first, the processor 21 refers to the painting pattern data 511 and randomly selects one painting pattern. Next, the processor 21 calculates the position of the selected painting pattern such that the transformed coordinates are at the center of the painting pattern when the painting pattern is placed on the virtual surface, and the processor 21 determines the update target region on the basis of the calculated position.

In the exemplary embodiment, the example in which the painting pattern is randomly selected has been described. However, in another exemplary embodiment, another condition may be used as the condition for selecting the painting pattern. For example, a painting pattern may be selected in consideration of an incident angle of the ink bullet. In the case where there are a plurality of types of ink guns, a painting pattern corresponding to the type of ink gun used may be selected.

Next, in step S24, the processor 21 specifies the UV region, on the paint texture, corresponding to the update target region on the virtual surface, as a painting target portion.

Next, in step S25, the processor 21 updates color information of pixels at the painting target portion of the paint texture with the color information of the association color of the character that has fired the ink bullet that impacted this time.

Then, the processor 21 ends the painting process.

[Other Various Kinds of Processing]

Referring back to FIG. 18, next, in step S5, the processor 21 executes other game processing on the basis of the operation data 512, etc. For example, the processor 21 controls the action of the own character (movement, action of firing the ink bullet, etc.) on the basis of the operation data 512. In addition, the processor 21 also executes processes such as action control of the enemy character and movement control of the fired ink bullet as appropriate.

[Rendering Process]

Figure 21:
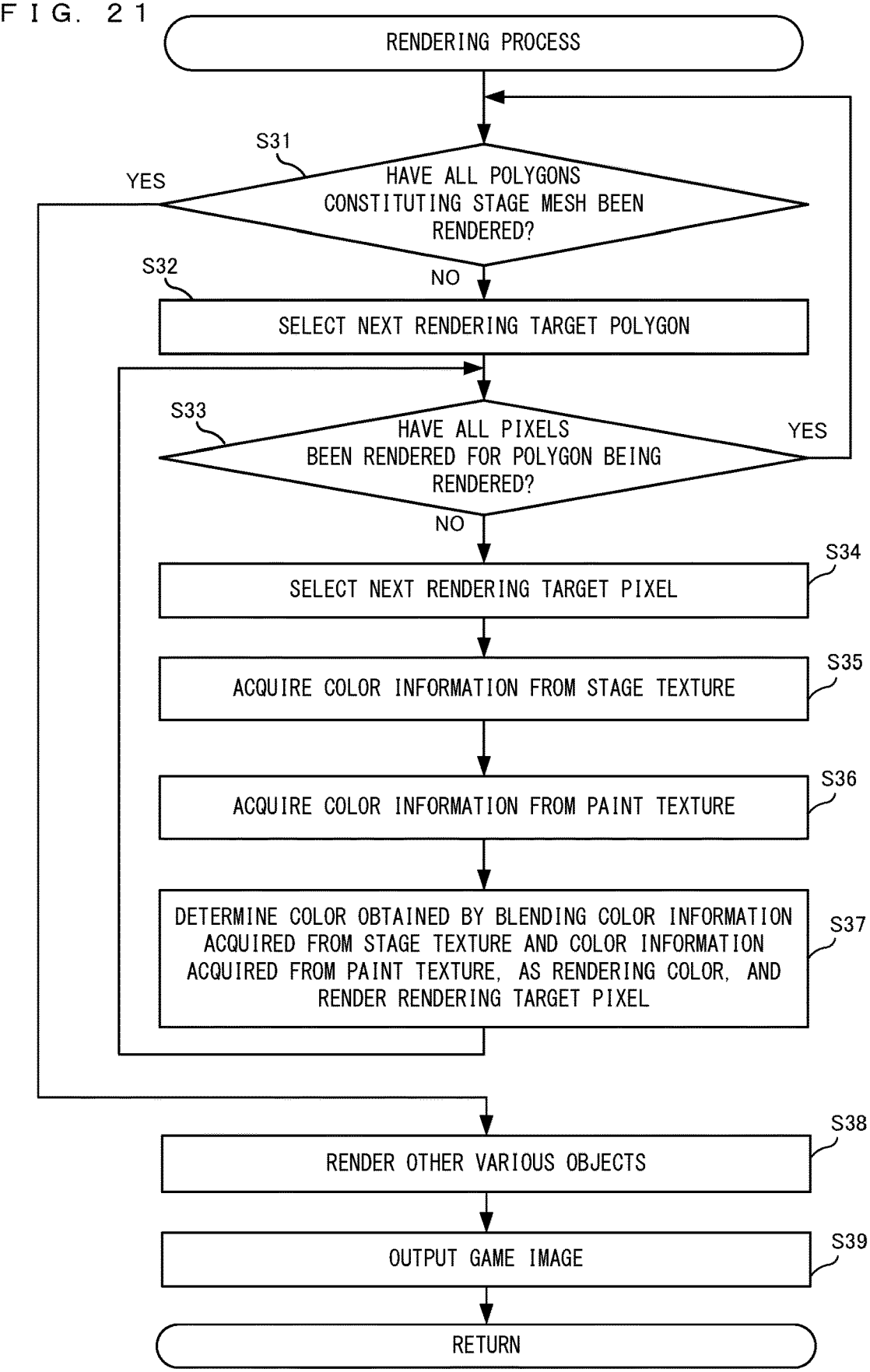
FIG. 21 is a non-limiting example flowchart showing the details of a rendering process.

Next, in step S6, the processor 21 executes a rendering process. FIG. 21 is a flowchart showing the details of the rendering process. In FIG. 21, first, in step S31, the processor 21 determines whether or not all the polygons constituting the stage mesh have been rendered. If not all the polygons have yet been rendered (NO in step S31), in step S32, the processor 21 selects a rendering target polygon to be rendered next, from among the polygons that have not yet been rendered.

Next, in step S33, the processor 21 determines whether or not all the pixels corresponding to the current rendering target polygon have been rendered. As a result of the determination, if all the pixels corresponding to the rendering target polygon have been rendered (YES in step S33), the processor 21 returns to step S31 above and repeats the processing. On the other hand, if not all the pixels have been rendered (NO in step S33), in step S34, the processor 21 selects a rendering target pixel to be rendered next, from among the pixels that have not been rendered.

Next, in step S35, the processor 21 acquires the color information at the UV coordinates, in the stage texture, corresponding to the rendering target pixel for the stage mesh. Specifically, first, the processor 21 specifies the UV coordinates, in the stage texture, corresponding to the vertex information of the stage mesh. Then, the processor 21 acquires the color information at the UV coordinates.

Next, in step S36, the processor 21 acquires the color information at the UV coordinates, in the paint texture, corresponding to the rendering target pixel for the stage mesh. Specifically, the processor 21 refers to the stage-paint texture association relationship data 509 and specifies the UV coordinates, in the paint texture, corresponding to each vertex of the stage mesh. Then, the processor 21 acquires the color information at the specified UV coordinates.

Next, in step S37, the processor 21 determines the rendering color of the rendering target pixel by blending the colors at the UV coordinates acquired from the stage texture and the paint texture, respectively. In this case, the blending is performed such that rendering is performed with the color of the paint texture in preference to the color of the stage texture. That is, the rendering color is determined such that the paint texture is overlaid on the stage texture. In the exemplary embodiment, as for the blending ratio, the blending is performed such that rendering is performed with a ratio of the color of the stage texture as 0% and a ratio of the color of the paint texture as 100%. Then, various lighting processes, etc., are performed, and the final rendering color of the pixel for the stage mesh is determined. Then, the processor 21 renders the rendering target pixel using the rendering color. Then, the processor 21 returns to step S33 above and repeats the processing.

The process of determining the rendering color such that the paint texture is overlaid on the stage texture is not limited to the above, and, for example, a process of determining a pixel to be rendered may be performed by applying a technique such as alpha test or stencil test (only the portions at which the color information of the paint texture has been updated are blended, or the portions of the stage texture corresponding to the portions at which the color information has been updated are not rendered, etc.).

On the other hand, as a result of the determination in step S31 above, if the rendering of all the polygons constituting the stage mesh has been completed (YES in step S31), in step S38, the processor 21 renders various objects such as characters.

Next, in step S39, the processor 21 generates a final game image by combining an image of the virtual space generated by the above rendering, with an image of a UI portion, etc., as necessary, and outputs the final game image as a video signal. Then, the processor 21 ends the rendering process.

[Game End Determination]

Referring back to FIG. 20, next, in step S7, the processor 21 determines whether or not a condition for ending the play of the stage currently being played has been satisfied (e.g., whether or not a match time has elapsed, etc.). If the condition has not been satisfied (NO in step S7), the processor 21 returns to step S2 above and repeats the processing. If the condition has been satisfied (YES in step S7), the processor 21 ends the game processing.

This is the end of the detailed description of the game processing of the exemplary embodiment.

As described above, in the exemplary embodiment, the stage mesh/collision is subdivided to a certain extent and associated via the virtual surfaces. Furthermore, a collision (impact position) is determined in the 3D coordinate system, and the range (update target region, painting target portion) where the color information is updated is determined in the 2-dimensional coordinate system of the corresponding virtual surface. Then, rendering is performed such that the paint texture whose color information has been updated is attached to the stage mesh. Accordingly, when performing a representation in which only the color in a predetermined range around the collision occurrence position is updated, the color at the position on the stage mesh where the collision occurrence position is more accurately reflected can be updated.

Figure 22:
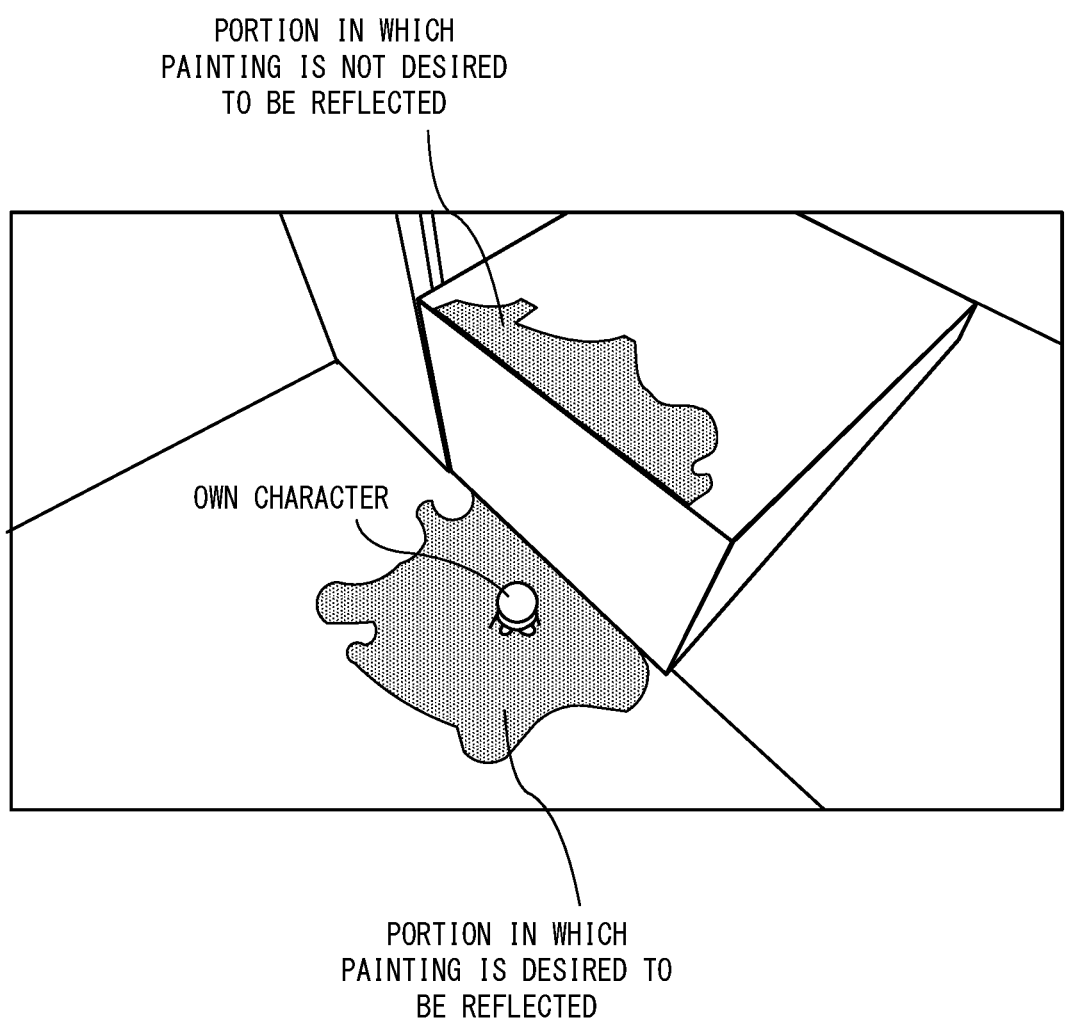
FIG. 22 illustrates a non-limiting example of rendering by conventional processing.

Here, for example, as a method that does not use the above-described virtual surfaces, the following method is conceivable: the color of ink is written on a texture having a size large enough to cover the entire virtual space and the texture is projected onto the virtual space, thereby performing rendering on the virtual space (which is a conventional method). However, when the projection is performed using this method, a portion with which ink comes into contact and a portion that is actually painted with the ink may be displaced relative to each other, for example, at a location having a step, a curved surface, etc. For example, when the own character is on the ground on the lower side of a step in the vicinity of the step, if ink is discharged toward the ground, the ink comes into contact with the ground on the lower side of the step, so that only the ground on the lower side of the step should be painted. However, with the rendering method by projection as in the conventional method, even the ground (part thereof) on the upper side of the step may be painted (see, for example, FIG. 22). That is, painting may be reflected by penetrating a part of a step (difference in depth or height, or the like). As a result, an uncomfortable feeling may be given to the user for the representation of the painted ground. In addition, if the height or depth is also determined in the rendering process in order to handle this point, the processing and control become more complex, so that there is a concern that the processing load may increase. In this respect, by associating the stage mesh and the collision via the virtual surfaces as in the above embodiment, the color at the position on the stage mesh where the collision occurrence position is more accurately reflected can be updated without increasing the processing load.

As another method that does not use the virtual surfaces, a method in which the vertex information of the collision is caused to have the UV coordinates of the paint texture is also conceivable. However, with this method alone, it is not possible to determine where and how much to paint at the impact position (in the above paint texture). Therefore, in the exemplary embodiment, the virtual surfaces are used as described above. That is, the impact coordinates are transformed into the coordinates in the local coordinate system of the virtual surface, the range and orientation to be painted with the ink on the virtual surface are calculated, and then the color information is updated by referring to the paint texture. Accordingly, the range to be painted with the ink can be a range more accurately corresponding to the impact position of the ink bullet, so that a painting representation that does not give an uncomfortable feeling can be performed.

Moreover, according to the exemplary embodiment, a reduction in development cost can be expected. For example, it is considered that the man-hours required to create the stage are increased when considering the fact that an association relationship between the stage mesh and the collision and an association relationship between the surface of each polygon of the stage mesh and the paint texture are directly set when the above stage is created at the stage of game development. For example, if the vertex information is caused to have the UV coordinates of the paint texture, it is considered that the man-hours required to create the stage are increased as the number of vertices of the stage mesh is increased. Also, for example, after the stage is created, if the need to make minor correction or the like for a part of the stage arises, it is also considered that the need to reset the above association relationships arises and the man-hours required are increased. In this respect, in the exemplary embodiment, simply by placing the collision without being aware of the number of vertices, etc., virtual surfaces are automatically generated on the basis of the placed collision, and the stage mesh and the collision, and also the stage mesh and the paint texture can be associated using the virtual surfaces. Accordingly, a reduction in the man-hours required to set the above association relationships can be expected.

MODIFICATIONS

In the above embodiment, the example in which terrain such as the ground and walls is painted with ink has been described. However, in another exemplary embodiment, the target to be painted as described above is not limited to the terrain, and may be any range as long as it is a predetermined range in the virtual space. For example, a predetermined moving object (the surface thereof) may be the target.

In the above embodiment, the example of the game in which the ground, etc., are painted with the ink having the association color of each character has been described. In another exemplary embodiment, for example, the above processing is applicable to a game in which the ground, etc. are dirty from the beginning and cleaning bullets are fired instead of the ink to remove the dirt. That is, the above processing related to update of the color information in "painting" may be applied to "washing" the dirty ground, etc.

As for the placement of the virtual surfaces, in the case where the virtual space is assumed to be divided into, for example, a grid of rectangular parallelepipeds, each surface of each rectangular parallelepiped may be used as the virtual surface. In this case, if the size of the virtual space is common among a plurality of stages, the placement positions of the virtual surfaces can also be common among the plurality of stages. Thus, the virtual surface data 508 which defines the placement positions of the virtual surfaces for each stage can be omitted.

As for the above-described combining of adjacent virtual surfaces, in addition to performing the adjacency determination and the setting of combining in the stage preparation process as described above, for example, the adjacency relationship may be determined when an impact occurs. To give an example, first, it is determined whether or not the impact position is near the edge of a virtual surface. As a result, if the impact position is near the edge, it may be further determined whether or not adjacent virtual surfaces exist. Then, if adjacent virtual surfaces exist, the above painting process, etc., may be performed with the adjacent virtual surfaces as one virtual surface.

In the above embodiment, the example of control in which, in the stage preparation process, virtual surfaces are generated on the basis of the collision and then the virtual surface and the stage mesh are associated with each other, has been described. In another exemplary embodiment, data that defines the association between the virtual surfaces, the collision, and the stage mesh may be prepared in advance, and may be loaded in the stage preparation process, whereby control in which the process related to generation of virtual surfaces as described above is omitted may be performed. In addition, control in which the collision and the stage mesh (and the paint texture) are associated with each other via the virtual surfaces may be performed by a method other than the above.

In the above embodiment, as for the association between the virtual surfaces and the paint texture, the example in which association is performed such that one paint texture is shared by a plurality of virtual surfaces, has been described. However, a different paint texture may be prepared for each virtual surface, and association in which the paint texture is assigned to each virtual surface may be performed.

In the above embodiment, the game processing has been described as an example of the information processing. However, the above processing is applicable to simulator applications using virtual spaces, etc.

In the above embodiment, the case where the series of game processing is performed in the single game apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A non-transitory computer-readable storage medium having stored therein instructions that, when executed by a computer of an information processing apparatus, cause the computer of the information processing apparatus to provide execution comprising:

reading data regarding a polygon mesh in a virtual space, a first texture associated with the polygon mesh in a first association relationship, a collision for performing contact determination in the virtual space, and a second texture;

generating a virtual surface corresponding to the collision, on the basis of at least a position of the read collision in the virtual space;

associating the polygon mesh and the virtual surface with each other on the basis of at least a position in the virtual space of the generated virtual surface;

associating the generated virtual surface and the read second texture with each other in a second association relationship;

causing a color update event targeting a predetermined range to occur in the virtual space in which the polygon mesh and the virtual surface have been associated with each other and the virtual surface and the second texture have been associated with each other;

in association with the predetermined range targeted by the color update event overlapping the collision, updating color information of the second texture at coordinates corresponding to a position where the predetermined range overlaps the collision, on the basis of an association relationship between the collision and the virtual surface and the second association relationship between the virtual surface and the second texture; and rendering the polygon mesh using the first texture and the second texture.

2. The non-transitory computer-readable storage medium according to claim 1, wherein a plurality of the virtual surfaces corresponding to a part of the collision in the virtual space are generated, and a part of the polygon mesh is associated with each of the plurality of the virtual surfaces.

3. The non-transitory computer-readable storage medium according to claim 2, wherein the part of the polygon mesh is associated on the basis of a size of each of the plurality of the virtual surfaces.

4. The non-transitory computer-readable storage medium according to claim 2, wherein the plurality of the virtual surfaces are associated so as to be assigned to different portions of the second texture, respectively.

5. The non-transitory computable-storage medium according to claim 1, wherein the virtual surface corresponding to the collision is generated on the basis of at least a position and an orientation of the collision.

6. The non-transitory computer-readable table storage medium according to claim 1, wherein the polygon mesh and the virtual surface are associated with each other on the basis of at least a position and an orientation of the virtual surface in the virtual space.

7. The non-transitory computer-readable storage medium according to claim 1, wherein the virtual surface and the polygon mesh are associated with each other on the basis of a position and an orientation at and in which the virtual surface is placed in the virtual space and a position and an orientation of the polygon mesh.

8. The non-transitory computer-readable storage medium according to claim 1, wherein
   in association with the predetermined range targeted by the color update event overlapping the collision, an update target region including first coordinates, at which the predetermined range and the collision overlap, in a first coordinate system corresponding to the virtual surface is determined on the basis of an association relationship between the collision and the virtual surface, and
   color information at coordinates, corresponding to the update target region, on the second texture is updated on the basis of the second association relationship between the virtual surface and the second texture.

9. The non-transitory computer-readable storage medium according to claim 8, wherein in association with at least two virtual surfaces determined to be adjacent to each other in accordance with positions and orientations thereof among a plurality of the virtual surfaces, the polygon mesh and the adjacent virtual surfaces are associated with each other such that the adjacent virtual surfaces are treated as one virtual surface.

10. The non-transitory computer-readable storage medium according to claim 9, wherein association with the first coordinates being calculated, the update target region is determined using one pattern determined on the basis of a predetermined condition from among a plurality of patterns prepared in advance.

11. The non-transitory computer-readable storage medium according to claim 1, wherein
    the second texture associated with the virtual surface on the basis of the second association relationship, and the polygon mesh are further associated with each other in a third association relationship, and
    the polygon mesh is rendered using the second texture associated in the third association relationship.

12. The non-transitory computer-readable storage medium according to claim 1, wherein the instructions further cause the computer to provide execution comprising:
    executing game processing of constructing a game stage in which the polygon mesh is placed as terrain, and causing a character object placed in the game stage to perform a shooting action on the basis of a user operation, wherein; in the update of the color information, in association with the character object performing the shooting action, the color update event is caused to occur, and the predetermined range is determined on the basis of an impact position in the shooting action.

13. The non-transitory compote-readable storage medium according to claim 12, wherein
    a plurality of the character objects are placed in the game stage,
    a predetermined color is associated with each character object, and
    the color information of the second texture is updated using the color associated with a character object on the basis of which the predetermined range is determined and that has performed the shooting action.

14. The non-transitory computer-readable storage medium according to claim 13, wherein in the game processing, in association with a color of a portion, on the polygon mesh, at which the character object is located being a color updated with the color associated with the character object, an effect advantageous to the character object is generated.

15. The non-transitory computer-readable storage medium according to claim 1, wherein
    a plurality of the virtual surfaces corresponding to a part of the collision in the virtual space are generated, and
    virtual surfaces, of the plurality of virtual surfaces, placed adjacent to each other are combined and treated as one virtual surface.

16. An information processing apparatus, comprising:
    processing circuitry including at least one processor, wherein the processing circuitry is configured to:
        read data regarding a polygon mesh in a virtual space, a first texture associated with the polygon mesh in a first association relationship, a collision for performing contact determination in the virtual space, and a second texture;
        generate a virtual surface corresponding to the collision, on the basis of at least a position of the read collision in the virtual space;
        associate the polygon mesh and the virtual surface with each other on the basis of at least a position in the virtual space of the generated virtual surface;
        associate the generated virtual surface and the read second texture with each other in a second association relationship;
        cause a color update event targeting a predetermined range to occur in the virtual space in which the polygon mesh and the virtual surface have been associated with each other and the virtual surface and the second texture have been associated with each other;
        in association with the predetermined range targeted by the color update event overlapping the collision, update color information of the second texture at coordinates corresponding to a position where the predetermined range overlaps the collision, on the basis of an association relationship between the collision and the virtual surface and the second association relationship between the virtual surface and the second texture; and
        render the polygon mesh using the first texture and the second texture.

17. An information processing method executed by a computer configured to control an information processing apparatus, the information processing method comprising:
    reading data regarding a polygon mesh in a virtual space, a first texture associated with the polygon mesh in a first association relationship, a collision for performing contact determination in the virtual space, and a second texture;
    generating a virtual surface corresponding to the collision, on the basis of at least a position of the read collision in the virtual space;
    associating the polygon mesh and the virtual surface with each other on the basis of at least a position in the virtual space of the generated virtual surface;
    associating the generated virtual surface and the read second texture with each other in a second association relationship;
    causing a color update event targeting a predetermined range to occur in the virtual space in which the polygon mesh and the virtual surface have been associated with each other and the virtual surface and the second texture have been associated with each other;

in association with the predetermined range targeted by the color update event overlapping the collision, updating color information of the second texture at coordinates corresponding to a position where the predetermined range overlaps the collision, on the basis of an association relationship between the collision and the virtual surface and the second association relationship between the virtual surface and the second texture; and rendering the polygon mesh using the first texture and the second texture.

18. The information processing method according to claim 17, wherein
a plurality of the virtual surfaces corresponding to a part of the collision in the virtual space are generated,
a part of the polygon mesh is associated with each of the plurality of the virtual surfaces, and
the part of the polygon mesh is associated on the basis of a size of each of the plurality of the virtual surfaces.

19. The information processing method according to claim 17, wherein
a plurality of the virtual surfaces corresponding to a part of the collision in the virtual space are generated,
a part of the polygon mesh is associated with each of the plurality of the virtual surfaces, and
the plurality of the virtual surfaces generated are associated so as to be assigned to different portions of the second texture, respectively.

20. An information processing system, comprising:
a processor; and
a memory configured to store computer readable instructions that, when executed by the processor, cause the information processing system to:

read data regarding a polygon mesh in a virtual space, a first texture associated with the polygon mesh in a first association relationship, a collision for performing contact determination in the virtual space, and a second texture;

generate a virtual surface corresponding to the collision, on the basis of at least a position of the read collision in the virtual space;

associate the polygon mesh and the virtual surface with each other on the basis of at least a position in the virtual space of the generated virtual surface;

associate the generated virtual surface and the read second texture with each other in a second association relationship;

cause a color update event targeting a predetermined range to occur in the virtual space in which the polygon mesh and the virtual surface have been associated with each other and the virtual surface and the second texture have been associated with each other;

in association with the predetermined range targeted by the color update event overlapping the collision, update color information of the second texture at coordinates corresponding to a position where the predetermined range overlaps the collision, on the basis of an association relationship between the collision and the virtual surface and the second association relationship between the virtual surface and the second texture; and render the polygon mesh using the first texture and the second texture.

* * * * *